United States Patent [19]

Calaway

[11] 4,097,792
[45] Jun. 27, 1978

[54] BATTERY CHARGER CONTROL CIRCUIT

[75] Inventor: Ward Martin Calaway, Sierra Madre, Calif.

[73] Assignee: Lester Electrical of Nebraska, Inc., Lincoln, Nebr.

[21] Appl. No.: 748,732

[22] Filed: Dec. 9, 1976

[51] Int. Cl.² .............................................. H02J 7/04
[52] U.S. Cl. ...................................... 320/22; 320/37; 320/39
[58] Field of Search ....................... 320/19, 20, 37, 38, 320/39, 40, 22-24

[56] References Cited
U.S. PATENT DOCUMENTS

| 3,867,681 | 2/1975 | Bishop et al. | 320/37 X |
| 3,886,427 | 5/1975 | Long | 320/37 X |
| 4,016,474 | 4/1977 | Mason | 320/38 X |

Primary Examiner—Robert J. Hickey
Attorney, Agent, or Firm—Vincent L. Carney

[57] ABSTRACT

To prevent reduction in the efficiency of a battery in the wintertime for batteries used on vehicles outdoors, charging runs are automatically initiated in two or three hour intervals which are timed by 10 Hertz (Hz) clock pulses that are applied to a first counter normally used to measure the potential of the battery with the output from a selected terminal of the first counter being applied through a summer-winter switch to a second counter normally used to measure the rate of change of the potential of the battery. When the number of counts have elapsed indicating a two or three hour delay, the output from the second counter initiates a charging run. The summer-winter switch may be manual or temperature-controlled and may include one or more other positions to disconnect the timing circuit or connect a different terminal of the first counter to the second counter to initiate charging runs every two and one-half days during storage of the battery for long periods of time.

15 Claims, 2 Drawing Figures

BATTERY CHARGER CONTROL CIRCUIT

This invention relates to apparatuses for controlling battery chargers.

One class of apparatus for controlling the operation of a battery charger includes a potential measuring counter that follows the potential of the battery that is being charged, increasing its count as the potential of the battery increases, and a timer that provides control signals indicating when the rate of charging falls below a predetermined rate. When the rate of charging falls below the predetermined rate, the timer provides a signal to the battery charger switching unit which de-energizes the battery charger. This class of battery charger is described in U.S. Pat. No. 3,794,905 issued on Feb. 26, 1974, to Ronald E. Long.

The battery charger described in U.S. Pat. No. 3,794,905 has been found to have great flexibility. Minor modifications in the circuitry are possible to enable it to serve many different functions using the same circuitry. For example, a modification described in U.S. Pat. No. 3,886,427 to Ronald E. Long causes charging runs to be started after two and one half days during winter storage to maintain a charge on the battery with a minimum of new circuit elements.

The aforementioned class of battery chargers work well. However, it has been found that some batteries which are used outdoors and charged outdoors have a reduction in efficiency of the battery during winter usage. The prolonged cold causes sulfonation of the battery during periods when it is outdoors. This has proved to be a severe disadvantage in such batteries.

Accordingly, it is an object of the invention to provide a novel battery charger control circuit.

It is a further object of the invention to provide a control circuit for a battery charger which prevents a reduction in the efficiency of the battery when used and stored at low temperatures.

It is a still further object of the invention to provide a control circuit for a battery charger which periodically heats the battery.

It is a still further object of the invention to provide a control circuit for a battery which initiates a charging run every two or three hours so as to prevent a reduction in the efficiency of the battery when it is exposed to low temperatures.

It is a still further object of the invention to provide a control circuit for battery chargers having a selector switch, which in one position causes a charging run to be initiated every two or three days during prolonged storage of the battery, and in another position, causes charging runs to be initiated every two or three hours to permit use of the battery with maximum efficiency at low temperatures.

It is a still further object of the invention to provide a battery charger control circuit which utilizes components which are normally used to control the charging run of batteries for periodically initiating a charging run every two or three hours and thereby reduces cost by eliminating additional components for the same purpose.

In accordance with the above and further objects of the invention, there is provided an apparatus for controlling a battery charger having a measuring counter driven by a multivibrator, a digital-to-analogue converter for converting the count of the measuring counter to a potential, a comparator for comparing the potential from the digital-to-analogue converter with the potential of the battery being charged, and a timing counter controlled by the comparator for de-energizing the battery charger when the rate of charging is below a predetermined rate.

As the potential of the battery increases during charging, the higher potential is applied to the comparator from the battery. When the battery potential is above the potential provided to the comparator by the digital-to-analogue converter, the comparator energizes the multivibrator to increase the count on the measuring counter until the digital-to-analogue converter provides the same potential as the battery or a greater potential than the battery.

Each step in the potential caused by the measuring counter counting one bit position is considered a reference potential level. Each time the count on the measuring counter is increased, it applies a reset pulse to the timing counter. When the potential of the battery is above a predetermined potential, the timing counter is counted between reset pulses by a gated multivibrator. If the time between reset pulses to the timer exceeds a predetermined time while the gated multivibrator is applying pulses to it, a selected output terminal of the timer applies a pulse to a battery-charger control circuit which de-energizes the battery charger to end a charging run.

A summer-winter switch is provided, which in one position causes output pulses from the measuring counter to be applied to the timer each time the measuring counter reaches a certain level between charging runs while the gated multivibrator is inoperative. The terminal of the measuring counter is selected so that the timer will reach an output terminal at which it initiates a charging run after approximately two and one-half hours.

The summer-winter switch is utilized to periodically initiate charging runs, thus causing the battery to be heated periodically by charging so as to prevent sulfonation when the battery is used and charged at low temperatures such as during the winter in outdoor use of a vehicle or lift truck. It may be a manual switch or a temperature-sensitive switch.

From the above description, it can be seen that the battery charger control apparatus of this invention has the advantages of preventing a reduction in the efficiency of a battery when used at low temperatures and of being inexpensive.

The above and further features of the invention will be better understood from the following detailed description when considered with reference to the accompanying drawings, in which.

Figure 1:
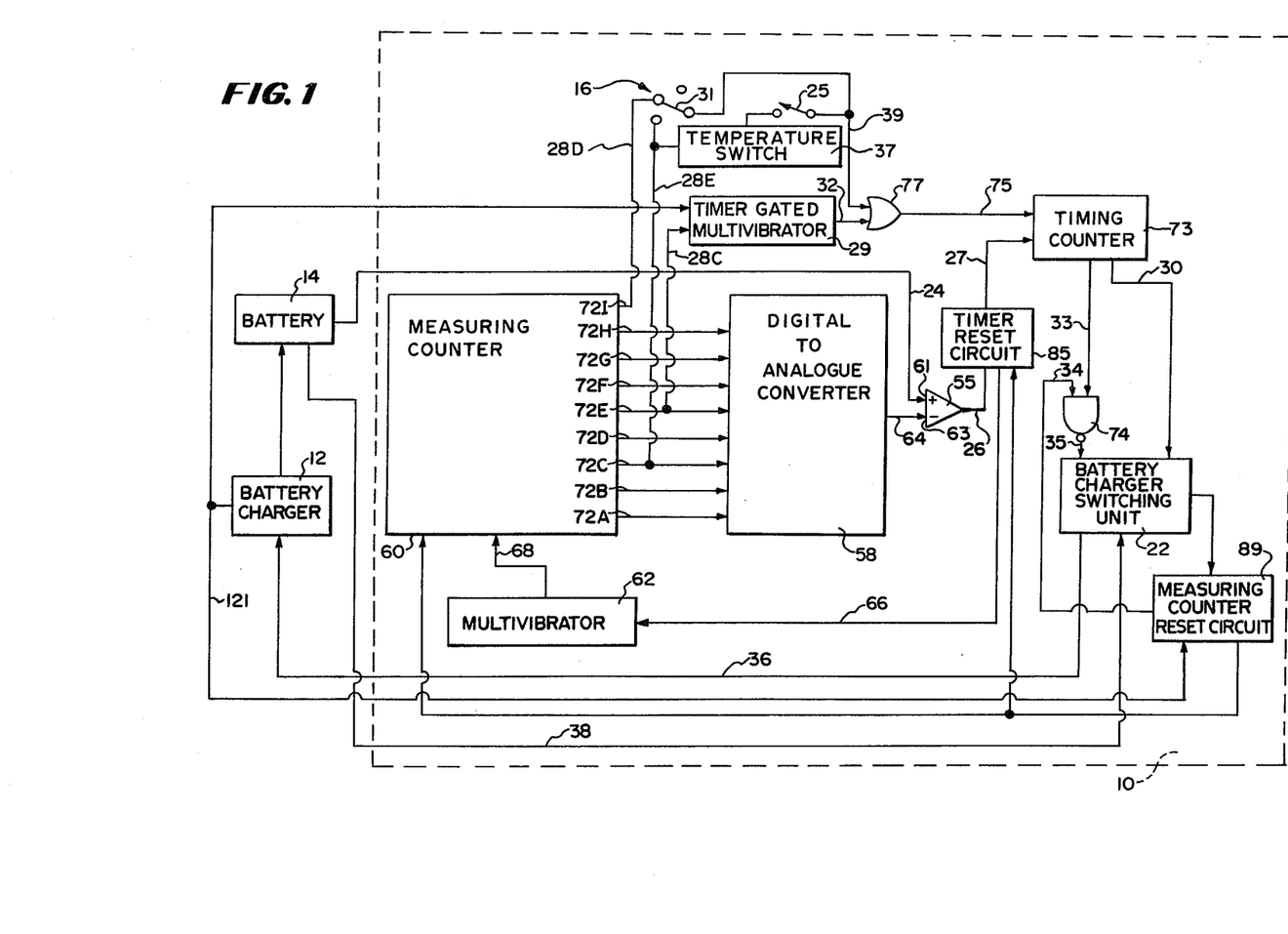
FIG. 1 is a block diagram of a battery-charger control circuit, battery charger and battery in accordance with an embodiment of the invention.

In FIG. 1, there is shown a battery-charger control circuit 10, a battery charger 12 and a battery 14, each being electrically connected to the other. The battery-charger control circuit 10 includes circuitry that senses the electrical potential, and de-energizes the battery charger 12 when the battery 14 is fully charged. It also includes a summer-winter circuit 16 that, in winter weather, automatically initiates a charging run every two and one-half hours to heat the battery and maintain it in efficient operating condition.

In the preferred embodiment, the battery charger 12 and the battery-charger control circuit 10 are of the type used to charge battery-powered vehicles such as golf carts and the like. This type of battery charger and battery-charger control circuit is described in greater detail in U.S. Pat. Nos. 3,794,905 and 3,886,427 to Ronald E. Long. While the battery charger 12 and battery-charger control circuit 10 are primarily intended to charge batteries for battery-powered vehicles, they may also be used to charge other types of batteries or batteries used for other purposes.

To control the battery charger 12, the battery-charger control circuit 10 includes a measuring counter 60, a multivibrator 62, a digital-to-analogue converter 58, a comparator 55, a timing counter 73 and a battery-charger switching unit 22.

The measuring counter 60, digital-to-analogue converter 58, multivibrator 62 and comparator 55 measure the potential of the battery 14 and supply digital information concerning changes in the potential level of the battery as it changes from one potential reference level to another to the timing counter 73. The timing counter 73 is electrically connected to the battery-charger switching unit 22 to provide signals thereto in response to which the battery-charger switching unit 22 prevents the battery charger 12 from applying further substantial charge to the battery 14 after the battery 14 is fully charged as indicated by a final low rate of change of the battery potential, which low rate of change is indicated by the time it takes for the battery potential to increase from one reference level to another.

The control circuit 10 also includes circuitry, described in greater detail in the aforementioned patents to Ronald E. Long and not described herein, which circuitry receives signals on any of several different conductors from the measuring counter 60, and, in response to the signals and to internally-generated logic, applies output signals to either the timing counter 73 or to the battery-charger switching unit 22 to perform any of several functions, such as: (1) de-energize the battery charger 12 if the potential of the battery 14 rises above a maximum potential; (2) select a time base for detecting a low-rate-of-change of potential; (3) provide stand-by protection for long periods of power shutdown time; and (4) decode the output of the timing counter 73 at certain times when the output is in a coded form not suitable for use with the circuitry to which it is being transmitted.

Other circuits described in the aforementioned United States patents to Ronald E. Long perform still further functions relying on internal logic. For example, a lagging-edge detector detects a predetermined count on a ripple-type binary counter in which the output from a particular terminal may occur more than once in different patterns to indicate different numbers. Similarly, there is a digital detector that stabilizes the battery-charger control circuit to avoid relay contact chattering and a circuit which detects an open voltage indicating that the battery is disconnected and rapidly de-energizes the battery charger.

To energize and de-energize the battery charger 12, the battery-charger switching unit 22 includes switches which are controlled in response to signals received over conductor 30 from the timing counter 73 and over conductor 35 from NAND gate 74, the control over the battery charger being indicated by the line 36 connecting the battery charger 12 and the battery-charger switching unit 22. The battery-charger switching unit 22 also receives the potential of the battery 14 through conductor 38, which potential serves as a reference and a source of power for certain switching operations within the battery-charger switching unit 22.

While in the preferred embodiment, the battery-charger control circuit 10 senses the potential of the battery 14 and controls the battery charger 12 in accordance with the sensed potential, it is also possible to construct a battery-charger control circuit which operates in accordance with the principles of this invention but senses the charging current instead of the potential of the battery 14. The changes necessary in the preferred embodiment to enable the battery-charger control circuit to operate by sensing the charging current rather than the potential of the battery 14 are known to persons skilled in the art so that a person skilled in the art would be able to make such changes from the description provided herein.

The timing counter 73 has a reset terminal electrically connected to the conductor 27, a counter input terminal electrically connected to the conductor 75, a start-cycle output terminal electrically connected to the conductor 33, and a de-energized battery-charger output terminal electrically connected to the conductor 30.

When the timing counter 73 is counting during a charging run, clock pulses are applied to its count input terminal through the conductor 75, causing it, unless reset by a positive pulse on conductor 27, to provide an input pulse to the conductor 30 forty minutes after starting a count. The clock pulses may be 1.72 Hz pulses of other rates are also possible. With this mechanization, the counter 73 measures the time between reset pulses and thus the time required for the battery potential to increase one potential reference level, providing a signal to de-energize the battery charger when this time becomes large enough to indiciate a rate of charging that is less than a predetermined rate. A second de-energized battery-charger output terminal may be used to terminate a charging run in a shorter time, such as, for example under some circumstances, after five minutes from the start of a run, for batteries which are only lightly discharged at the start of the charging run as described in the aforementioned United States patents to Ronald E. Long.

To generate reset pulses each time the potential of the battery increases above the last potential reference level, the operational amplifier 55, which serves as a comparator, has one of its input terminals 61 electrically connected to a conductor 24 to receive the potential of the battery 14 and the other of its input terminals 63 electrically connected to the output of the digital-to-analogue converter 58 through a conductor 64.

The potential reference levels are discrete amplitudes of potential, spaced apart from each other by predetermined increments of potential. The potential reference level at any one time is the last battery potential of one of the spaced-apart increments. In the preferred embodiment, charging nominal 36V batteries, a potential increment of 0.012 volts is selected so that the distance from one potential reference level to the other is 0.012 volts. There are approximately 1024 potential reference levels in a typical battery-charging run in the preferred embodiment. However, for other types of batteries, other applications, and other conditions of charging the batteries, there may be more or fewer potential reference levels.

To provide the reference levels, the counter 60 includes a plurality of output terminals, terminals 72A–72I being shown in FIG. 1 as examples, with certain output terminals being electrically connected to different inputs of the digital-to-analogue converter 58 so that the count of the counter 60 causes the digital-to-analogue converter 58 to apply a potential level to the input 63 of the comparator 55, which potential linear level is equivalent to the count of the counter 60.

The count on the counter 60 is increased whenever the battery potential on conductor 24 rises above the last reference applied to the conductor 64, resulting in the energization of the multivibrator 62 through the conductor 66. Under these circumstances, the multivibrator 62 generates pulses that are applied to the counter 60 through the conductor 68, causing the count on the counter 60 to increase. When the count of the counter 60 increases, new reference levels are obtained at the output of the digital-to-analogue converter 58 until the potential at input 63 equals or is greater than the potential at input 61, in which case the output of the comparator 55 is low, thus stopping the multivibrator 62.

The output terminals 72A–72I of the counter 60 provide a signal at any one time indicating the next higher reference level from the last level through which the battery potential has passed during the charging run. These signals therefore give an indication of the battery-charging potential which may be used for many purposes, one of which is to control the internal logic within the battery charger and control circuit.

One important logic function that may be controlled is the starting of a charging run after the battery 14, battery charger 12 and battery-charger control circuit 10 have been connected without the battery 14 being used for a long period of time such as two and one-half days, which may occur during storage of battery-powered vehicles such as golf carts. Other functions are described in the aforementioned United States patents to Ronald E. Long.

To apply a potential to the positive input of the operational amplifier 55 that corresponds to the last reference level established by the counter 60, the digital-to-analogue converter 58 includes a plurality of input terminals, each electrically connected to a different one of the output terminals of the counter 60. The digital-to-analogue converter 58 converts the digital signals received from the counter 60 into a corresponding potential level and applies this potential level to the negative input of the operational amplifier 55 through the conductor 64. In the preferred embodiment, the digital-to-analogue converter 58 is a resistor ladder type of converter but other types are, of course, usable with the proper modification.

To apply a 1.72 Hz counting pulse to the timing counter 73, a timer-gated multivibrator 29 has one input electrically connected to an output terminal 72E of the measuring counter 60 through a conductor 28C and another input electrically connected to the battery charger 12 through a conductor 121, which conductor 121 is energized whenever the battery charger 12 is energized to apply a potential across the battery 14. The output terminal 72E of the conductor 60 applies a potential to the conductor 28C when the potential of the battery reaches a level of 39.7 volts (when used with nominal 36V batteries). In response to potentials on conductors 121 and 28C indicating that the battery charger 12 is energized and the potential of the battery is 39.7 volts or higher, the timer-gated multivibrator 29 is energized and applies the 1.72 Hz pulses to the timing counter 73 through the conductor 32, one input of the OR gate 77 and the conductor 75.

To maintain the condition of batteries in vehicles that remain in the cold during the winter but are used and to prevent batteries from becoming completely discharged when stored for long periods of time in the cold, the measuring counter 60 and the timing counter 73 cooperate to start new charging runs after a preset period of idleness. Batteries in vehicles that are stored in the cold during the winter months may include a circuit that is energized after a charging run has ended to measure a two and one-half day time period, after which, the battery-charger switching unit 22 is caused to initiate another charging run. Similarly, batteries in vehicles that are in use during the winter but are charged outdoors are maintained in condition by charging runs initiated every two and one-half hours under the control of the summer-winter circuit 16.

During the measurement of time before initiating charging runs, the timer-gated multivibrator 29 is inactive since no level is received on conductor 121 from the battery charger 12, thus preventing the generation of oscillations from the timer-gated multivibrator even though the battery potential is at a higher level than 39.7 volts.

To permit the cooperation between the measuring counter 60 and the timing counter 73 in one embodiment, the summer-winter circuit 16 in the battery-charger control circuit 10 includes a three position summer-winter switch 31, a single-pole single-throw summer-winter switch 24, and a temperature switch 37. The three position summer-winter switch 31 has one stationary contact connected to an output terminal 72I of the measuring counter 60 through a conductor 28D, a second stationary contact connected to an output terminal 28C of the measuring counter 60 through a conductor 28E, a third open circuited contact and a movable armature contact connected to one input of the OR gate 77 through a conductor 39.

In another embodiment, a single summer-winter mode switch and cooperating internal switching circuit replaces the switches 16, 25 and 37. The summer-winter mode switch, when in the winter position energizes a reed relay which connects conductor 28E to the input of OR gate 77 and, when in the summer position, de-energizes the reed relay which then disconnects conductor 28E from the input of OR gate 77.

The movable switch arm of switch 31 is connected to conductor 39 and is in contact with one of: (1) the stationary contact connected to output terminal 72I of the measuring counter 60 through conductor 28D to measure the two and one-half day time period for automatically initiating a charging run during storage; (2) the stationary contact connected to output terminal 72C through conductor 28E to measure the two and one-half hour time period before initiating a charging run to maintain the battery during the winter; and (3) the open-circuited contact to disconnect the winter storage charging runs and the maintenance charging runs that are not controlled by the temperature. Although two and one-half day periods and one-half hour periods are saved in this embodiment, other time periods can obviously be selected instead.

Instead of or as an alternative to the manual switch 31, the temperature switch 37 and single-pole single-throw switch 25, may connect the conductors 28E and 39. Any suitable switch such as a bi-metal switch which will connect these conductors at low temperatures such as 40° F. may be used as the temperature switch 37 to initiate the maintenance control charging runs. Such a switch does not interfere with the normal control of the circuit by the measuring counter and the digital-to-analogue converter since it adds only one pulse for each charging run to the timing counter 73 which is a small percentage of the total number of pulses during a charging run. It may be used either as a substitute or in combination with the switch 31 for winter maintenance of the battery. One terminal of the temperature switch 37 is connected to conductor 28E and the other to the fixed contact of switch 25, the switch arm of which is electrically connected to conductor 39 so that when switch 25 is closed, the temperature switch 37 initiates a charging run every two and one-half hours during the winter while the vehicle is not in use.

The winter maintenance mode is intended for batteries which must have maximum capacity and are charged for use within a few hours or a few days. To periodically start a charging run in the maintenance mode every two and one-half hours to maintain the condition of the battery, an output signal from a terminal of the measuring counter 60 provides a pulse through the three position switch 31 or the temperature switch 37 and single-pole single-throw switch 25, if included, to the timing counter 73 through the OR gate 77 and the conductor 75 to cause the timing counter 73 to count upwardly by one count each time the measuring counter 60 is counted from its lowest order to the terminal providing the pulse to the switches 31 or 37. The measuring counter 60 is reset at the start of each charging run by the measuring counter reset circuit 89 as explained in the aforementioned U.S. Pat. No. 3,886,427.

To initiate a charging cycle each two and one-half days when the three position switch 31 has its movable contact in contact with conductor 28D, the counter 60 counts upwardly to terminal 72I at which time it is reset to start a new cycle while a pulse is applied through conductor 28D, the three position switch 31, conductor 39, the OR gate 77, conductor 75 to the timing counter 73 in the order named.

In both counting sequences, pulses are applied to the timing counter 73 in the same manner as during a charging run, but the frequency is much slower since the pulses are applied to it only once for each cycle of the measuring counter 60 to either terminal 72C or terminal 72I. When the timing counter 73 is counted to its output terminal at a count of 512, a pulse is applied to the NAND gate 74 through the conductor 33 resulting in a pulse being applied to the battery-charger switching unit 22 through conductor 35, causing it to initiate a charging run in the manner to be described in greater detail hereinafter. The frequency at which the timing counter 73 is counted to pulse 512 is 32 times higher when the three position switch 31 has its movable contact in contact with conductor 28E for the short two and one-half hour cycle than when it is connected to 28D for the two and one-half day cycle.

Figure 2:
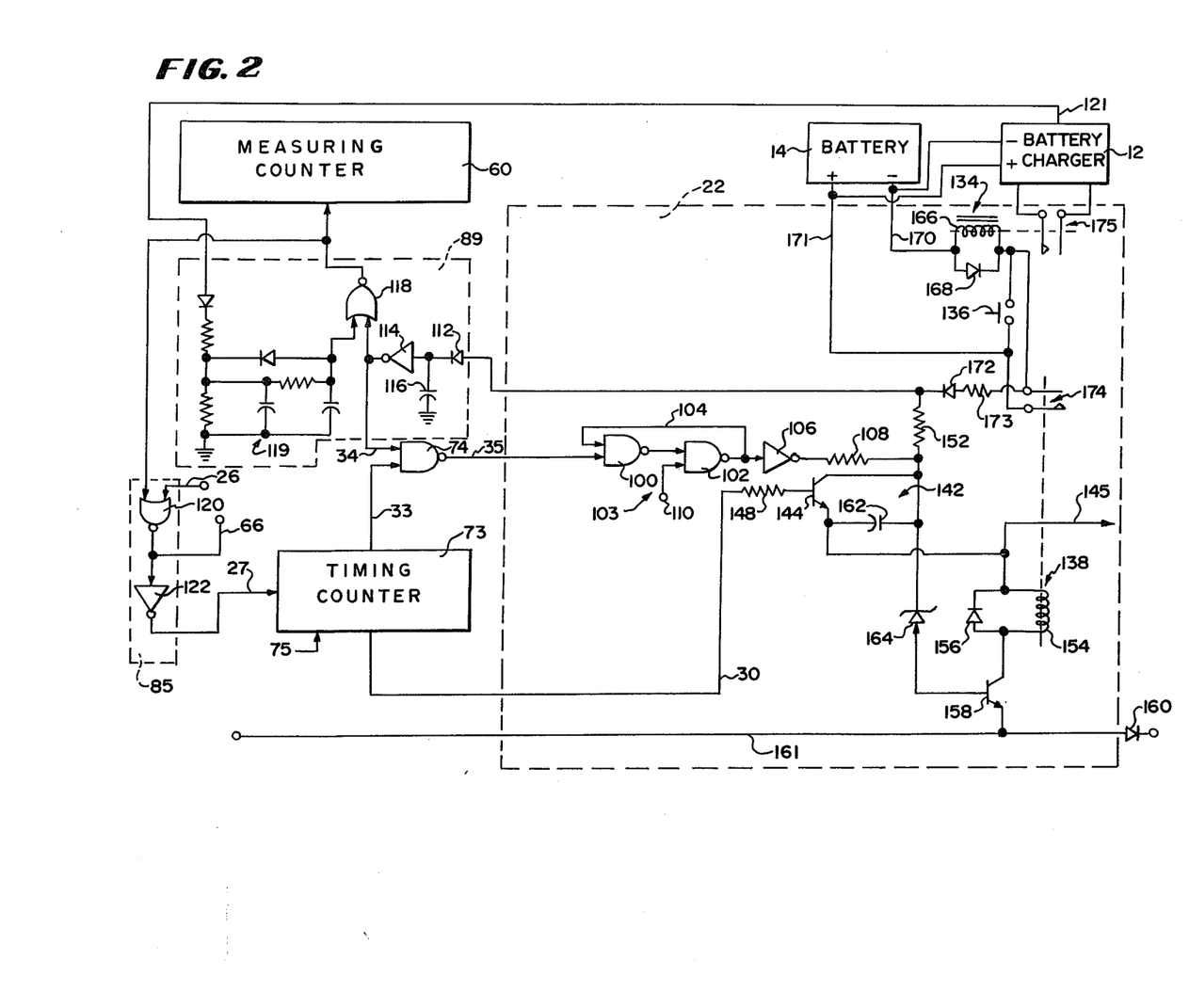
FIG. 2 is a schematic circuit diagram of a portion of the battery-charger control circuit shown in FIG. 1 in accordance with an embodiment of the invention.

In FIG. 2, there is shown a schematic circuit diagram of the battery-charger switching unit 22, the reset circuit 85 for the timing counter 73 and the reset circuit 89 for the measuring counter 60. The battery-charger switching unit 22 includes a power-control relay 134, a manual switch 136, a control relay 138 and a main logic switch 142.

The battery charger 12 is de-energized whenever a signal is received on the conductor 30 from the timing circuit 73.

To de-energize the battery charger 12 when a signal is received over the conductor 30, the main logic switch 142 includes an npn transistor 144 having its base connected to the conductor 30 through a resistor 148. To provide a potential to the collector of the transistor 144, the collector is connected to a source of positive potential through a resistor circuit 152.

To control the main power-control relay circuit 134 in response to signals from the main logic switch 142, the control relay 138 includes a relay coil 154 shunted by a diode 156 and connected at one end to the collector of an npn transistor 158, the emitter of the transistor 158 being connected to the source of negative potential from the battery through a diode 160. The other end of the relay coil 154 is connected to the emitter of the transistor 144, to a source of positive potential 145 and to one plate of a capacitor 162, the other plate of the capacitor 162 being electrically connected to the collector of the transistor 144. A zener diode 164 has its cathode electrically connected to the collector of the transistor 144 and to one plate of the capacitor 162 and has its anode electrically connected to the base of the transistor 158.

To energize or de-energize the battery charger 12, the main power-control relay circuit 134 includes a coil 166 shunted by a diode 168, with the coil 166 being connected at one end to a source of negative potential on conductor 170 and at the other end to a source of positive potential on conductor 171 through a pair of normally-open contacts 174 controlled by the control relay 138, one contact of the pair of contacts 174 and the one end of the coil 166 being connected to the anode of the blocking diode 172 through a current limiting resistor 173 which drops the battery potential to the logic level. The other contact of the relay 174 is electrically connected to one of the fixed contacts of the manual switch 136 and to a source of positive potential, the other fixed contact of the manual switch 136 being connected to the one side of the coil 166, with the moving contacts of the manual switch connecting these two contacts when depressed. When energized, the coil closes the relay contacts 175 of the power-control relay circuit 134 to energize the battery charger 12.

To provide a potential to circuit elements only when the battery charger is energized, the cathode of the blocking diode 172 is connected to the resistor circuit 152 and one power bus for the battery-charger control circuit 10 and the anode of the diode 160 is connected to another power bus 161 for the battery-charger control circuit 10.

To periodically start a charging cycle when the battery, battery charger and battery-charger control circuit are stored for long periods of time without the battery being used or when charged outdoors during the winter, reset circuits reset the measuring counter 60 and the timing counter 73 at the end of each charging run. The multivibrator 62 (FIG. 1) that applies pulses to the measuring counter 60 continues to be energized to provide pulses to the measuring counter after the charging run, with the measuring counter 60 and the timing counter 73 being connected so that one count is applied to the timing counter each time the measuring counter is counted to the order selected by switch 31. When a predetermined count is reached on the timing counter, an output potential of the timing counter 73 is applied to the battery-charger switching unit 22 to start a charging cycle.

To reset the measuring counter 60 at the end of a normal charging cycle, the measuring counter reset circuit 89 includes a diode 112, an inverter 114, a capacitor 116, a capacitor filter and a rectifier circuit 119, and a NOR gate 118. One plate of the capacitor 116 is grounded and the other is connected to the input of the inverter 114 and to the cathode of the diode 112, the anode of the diode 112 being electrically connected to the cathode of the diode 172 which maintains a reference voltage level when the battery charger is performing a charging run, the reference voltage being obtained by dropping the battery potential in resistor 173.

To apply a negative output to the measuring counter 60 during a charging run, a first of the two inputs of the NOR gate 118 is connected to the a.c. side of the secondary of the transformer within the battery charger 12 at 121 through the filter and rectifier circuit 119 and the second of the two inputs of the NOR gate 118 is connected to the output of the inverter 114. During a charging run, filtered positive potential is applied to the first input of the NOR gate 118 by the filter and rectifier circuit 119 and a negative potential is applied to the second input of the NOR gate 118 by the inverter 114, resulting in a negative output to the measuring counter 60 and to the NOR gate 120 of the reset circuit 85 for the timer 73.

A positive reset pulse is applied to the measuring counter 60 at the end of a charging run by this circuit because the potential at point 121 falls to ground rapidly as the battery charger 12 is de-energized at this time while the potential at the input of inverter 114 remains positive, being held at a positive potential by the stored charge on the capacitor 116 even though the potential at the cathode of diode 172 also falls at this time. Accordingly, the first input to NOR gate 120 receives a negative potential from the filter and rectifier circuit 119 and the second input to this gate receives a negative potential from the inverter 114, resulting in a positive output potential for a time.

When the capacitor 116 is discharged, the inverter 114 receives a negative input, resulting in a positive potential on the second input of NOR gate 118 while the first input receives a negative input, thus causing the NOR gate 118 to provide a negative output to counter 60 during the two and one-half day period before automatic turn-on so that the counter 60 counts during this time. These potentials are also applied to the NOR gate 120 of the timer reset circuit 85.

The input pulse to the diode 112 that initiates a reset operation in the reset circuits 89 and 85 is applied from the cathode of the diode 172 whenever the relay contacts 174 are opened at the end of a charging run. With this connection, the measuring counter 60 and the timing counter 73 are each reset at the end of every charging run by their respective reset circuits 89 and 85. When the timing counter 73 is reset by a pulse on conductor 26 or from NOR gate 118, the inverted output from NOR gate 120 is applied to the multivibrator 62 (FIG. 1) from conductor 66 (FIGS. 1 and 2) to trigger this multivibrator and begin counting on counter 60.

To start a charging run when two and one-half days have elapsed after a previous charging run, or when two or three hours have elapsed since the last charging cycle during cold weather for batteries which are charged outdoors and must be maintained near maximum, the battery-charger switching unit 22 includes a latch 103 having its input connected to the output of the NAND gate 74 and having its output connected through an inverter 106 and a resistor 108 to the collector of the transistor 144 in the switch 142. The latch 103 includes first and second two input NAND gates 100 and 102, with one of the inputs of the NAND gate 100 being connected to the output of the NAND gate 74 through the conductor 35, the other input of the NAND gate 100 being connected to the input of the NAND gate 102, one input of the NAND gate 102 being connected to the output of the NAND gate 100 and the other input of the NAND gate 102 being connected to receive reset pulses on terminal 110 from conductor 27 (FIG. 1), which are the same reset pulses that are applied to the timing counter 73 so that the latch 103 is reset each time a reset pulse is applied to the timing counter 73 at the end of a charging run or when the battery potential exceeds a reference level.

With this circuit, a pulse is applied by the timing counter 73 to one of the two inputs of the NAND gate 74, which, when receiving an input level from the inverter 114 indicating that a battery-charger run is not in progress, applies a negative input to the NAND gate 100 resulting in a positive output being applied to the NAND gate 102 which latches through the conductor 104 to provide a static potential to the inverter 106. The output of the inverter 106 is a static positive pulse that is applied to the collector of the transistor 144 through the resistor 108. Since transistor 144 is non-conducting because of the biasing from counter 73, the positive potential on the collector of transistor 144 is applied through the reverse resistance of zener diode 164 to the transistor 158 causing it to conduct. When the transistor 158 conducts, the relay 138 is energized so as to close its contacts 174 and energize the power control relay 134, thus initiating a charging run.

The battery charger 12 is energized before the battery 14 is connected to it, with the connector through which electrical connection is made to the battery 14 also including the necessary conductors to electrically connect the battery-charger control circuit 10 to the battery.

In the operation of the battery charger when the battery charger 12 is connected to the battery 14, a negative potential is applied to conductor 170 and a positive potential to the conductor 171 (FIG. 2) and the point 145. The positive potential applied at 145 establishes a reference potential at the cathode of the diode 172 which applies a potential through the zener diode 164 to the base of the transistor 158, causing a conduction path from the source of positive potential 145 through the coil 154 of the relay 138 and the transistor 158 to energize the control relay 138. When the control relay 138 is energized, the contacts 174 are closed to energize the winding of the relay 134. When the relay 134 is energized, the contacts 175 are closed to energize the battery charger 12.

During the charging of the battery, the battery potential is measured and, when it reaches a predetermined potential above a low rate of voltage change region of the battery, the timing counter 73 begins to detect the rate of change of potential of the battery until, when the battery is fully charged, the rate of charging falls below a predetermined minimum rate of change, at which time, the charging run is terminated.

To measure the battery potential, the counter 60 (FIG. 1) counts upwardly to a value equaling the potential of the battery and follows the potential of the battery in increments step-by-step as it increases, with an output signal being applied to the output conductor 26 each time the potential of the battery increases above the last potential reference level established by the counter 60.

To cause the counter 60 to count to the reference level just above the potential of the battery, the battery potential is applied to the non-inverting terminal 61 of the operational amplifier 55 where it is compared to the output potential from the digital-to-analogue converter 58, which output potential is applied to the inverting terminal 63 through the conductor 64.

At the start of a charging run, the digital-to-analogue converter 58 has a low potential output so that the comparator 55 provides a positive output to the multivibrator 62 which, in response, applies a series of clock pulses to the input terminal of the counter 60 through the conductor 68, which clock pulses cause the counter 60 to count upwardly.

To supply an analogue potential to the inverting terminal 63 of the comparator 55, the digital-to-analogue converter 58 receives the digital count from the counter 60 and converts it to an equivalent analogue value. In this manner, the comparator 55 continually compares the potential of the battery with the analogue representing the last reference level established by the counter 60, with the battery potential being applied through the conductor 24 and the reference potential level being applied through the conductor 64 to the comparator 55.

The timing counter 73 is in its reset condition at the beginning of a battery-charging run. At this time, no counting pulses are applied to the input of the timing counter 73 through the conductor 32. This avoids having the timing counter 73 begin counting while the potential applied to the comparator 55 from the battery 14 is rising with a low rate of change of potential at the very beginning of a charging run, thereby avoiding an early termination of the charging run.

When the potential of the battery passes through a predetermined reference potential level, which is 39.7 volts in the preferred embodiment, the counter 60 energizes the output terminal 72E which applies an output potential through conductor 28C to the timer-gated multivibrator 29, which in turn, applies 1.72 Hz pulses to the input of the counter 73 through the conductor 32, OR gate 77 and conductor 75, causing it to count upwardly. Each time the battery potential exceeds a potential reference level established by the counter 60 by a predetermined amount, a positive reset pulse is applied to the reset terminal of the timing counter 73 through the conductor 27, resetting the timing counter.

The timing counter 73 applies a signal to the output terminal connected to the conductor 30 which in one embodiment is forty minutes after the last reset pulse, which is when a count of 4096 is reached. This signal is applied to the battery-charger switching unit 22 which signal causes the battery-charger switching unit 22 to de-energize the battery charger 12.

To de-energize the control relay 138 whenever a positive signal is applied to the conductor 30, the transistor 144 is driven into conduction by the current flowing from its base to its emitter, causing the potential at the cathode of the zener diode 164 to fall to the level of source 145, switching off this zener diode. When the zener diode 164 is non-conducting, the transistor 158 is biased onto its non-conductive state, de-energizing relay 138.

When the control relay 138 is de-energized, the normally-open contacts 174 of the control relay 138 are opened, thus breaking the circuit through the coil 166 of the power control relay 134. When the circuit through the coil 166 is broken, the normally-open contacts of the power control relay 134 are permitted to open, thus de-energizing the battery charger 12.

When the battery charger 12 is de-energized, the measuring counter 60 and the timing counter 73 are reset by the reset circuits 89 and 85 respectively.

To reset the measuring counter 60, the reset circuit 89 receives a positive reset pulse from the NOR gate 118. This positive pulse results from a negative potential from the filter and rectifier circuit 119 applied to one input of the NOR gate 118 and a negative potential from the inverter 114 applied to the other input of the NOR gate 118.

The negative input to NOR gate 118 from the filter and rectifier circuit 119 occurs because the potential on conductor 121 drops rapidly as the battery charger 12 is de-energized. The negative potential from the inverter 114 occurs because the capacitor 116 discharges slowly as the potential on the cathode of the diode 172 drops.

To reset the timing counter 73, the reset circuit 85 senses the reset pulse applied by the NOR gate 118 to the reset input terminal of the measuring counter 60, and applies a positive pulse to the reset terminal of the timing counter 73 in response to it.

To sense the reset pulse applied to the reset terminal of the timing counter 60, the output of the NOR gate 118 is applied to one input of the NOR gate 120, the output of which is applied through the inverter 122 to the reset terminal of the timing counter 73 so that the reset terminal receives a positive pulse whenever a reset pulse is applied to the measuring counter 60.

After a charging run has been completed, and the battery charger de-energized, a new charging run may be started by depressing the push-button switch 136, which supplies a positive potential, when depressed, from conductor 171 through the diode 172 across the zener diode 164 to drive the transistor 158 into conduction, thus providing a path for current flow from the positive source 145 through the coil 154 of the relay 138 and the transistor 158. This current flow energizes the control relay 138, closing contacts 174 to energize the power control relay 134 by permitting current to flow from the positive source 171 through the relay winding 166 to the negative source 170.

If a new charging run is not started manually while the three position switch 31 connects conductor 28D (FIG. 1) to conductor 39 and the battery charger and battery are left connected for an extended period of time, a new charging run is started automatically approximately every two and one-half days. With this arrangement, if a battery such as one in a golf cart is left in storage, it will be periodically charged and thus maintained at a full charge with sufficient cycling to prevent sulfonation.

If a new charging run is not started manually while the three position switch 31 or the temperature switch 37 and single-pole single-throw switch 25 connects conductor 28C to conductor 39 and the battery charger and battery are left connected, a new charging run is started automatically every two and one-half hours. While this arrangement, if a battery used in an electric automobile or a lift truck is operated and charged outdoors during the wintertime, charging runs will be periodically started to maintain the battery in maximum operating condition in spite of short periods of inactivity in the cold which would otherwise reduce the effectiveness of the battery.

To time the two and one-half days or two and one-half hours before the battery charger 12 is energized, the multivibrator 62 (FIG. 1) is connected by the conductor 66 to the output of the NOR gate 120 (FIG. 2) which provides an energizing voltage to the multivibrator 62 whenever the battery potential is higher than the output of the digital-to-analogue converter 58 or the comparator is de-energized. Since the comparator 55 is de-energized when the battery charger 12 is de-energized, the multivibrator 12 provides 10 Hz pulses to the measuring counter 60 through the conductor 68 during this time.

Output terminal 72I of the measuring counter 60 is energized each time the multivibrator 62 provides 4096 pulses to be counted by the measuring counter 60 and output terminal 72C is energized each time the multivibrator 62 provides 128 pulses to be counted by the counter 60. When the selected one of the terminals 72I or 72C is energized, a pulse is applied through conductor 39 to the count terminal of the timing counter 73 through the NOR gate 77 and the conductor 75, causing the timing counter 73 to count upwardly by one each time the multivibrator 62 applies 4096 or 128 pulses to the measuring counter 60.

When the timing counter 73 counts to its output terminal that is 512 counts from the lowest order count, which count on the timing counter 73 is equivalent to 2,097,152 counts between zero and terminal 72I or 65,536 counts between zero and terminal 72C on the measuring counter 60, the timing counter 73 applies a positive pulse to the NAND gate 74, which receives a pulse from the measuring counter reset circuit 89 (FIG. 1) at the same time, causing a negative pulse to be applied to the NAND gate 100 (FIG. 2). The NAND gate 100, in turn, applies a positive pulse to the NAND gate 102, which applies a negative output pulse to the NAND gate 100 and the inverter 106 to cause the collector of the transister 144 to be pulled in a positive direction and to be latched in this state. Since the transistor 144 is non-conducting, a positive potential is applied to the base of the transistor 158, causing the winding 154 of the relay 138 to be energized.

When the winding 154 of the relay 138 is energized, the relay contacts 174 are closed causing the winding 166 of the relay 134 to be energized and the battery charger 12 to receive power and to start a new charging run.

From the above description, it can be understood that the battery charger of this invention has the advantage of maintaining a battery in maximum usable condition even though it is a battery which is charged outdoors during the wintertime, and that the principal parts of the circuitry for performing this function are already in the battery charger, thus resulting in an inexpensive circuit for this purpose.

Although the preferred embodiment of the invention has been described with some particularity, many modifications and variations are possible in the preferred embodiment without deviating from the invention. Accordingly, it is to be understood, that within the scope of the appended claims, the invention may be practiced otherwise than as specifically described.

What is claimed is:

1. Apparatus for controlling the charging of a battery, comprising:

multiple-purpose means for generating a first control signal when the rate of charging of the battery falls below a predetermined rate during a charging run and generating a second control signal;

said multiple-purpose means including selector means for activating said multiple-purpose means to initiate charging runs a predetermined time after the termination of a charging run in response to said second control signal;

said selector means including manually activatable means for including said selector means in circuit with said multiple-purpose means;

said multiple-purpose means further including measuring means for measuring the potential of a battery;

said measuring means including a first counter and means for applying pulses to said first counter;

said first counter having a plurality of output terminals;

said multiple-purpose means further including a timer;

said timer including a second counter;

said multiple-purpose means further including switch means for applying a signal to said second counter from a selected one of said plurality of output terminals of said first counter when said multiple-purpose means is measuring the time since the termination of the previous cycle;

said second counter including means for generating said first control signal and said second control signal;

said multiple-purpose means including means for terminating a charging run in response to said first control signal;

said multiple-purpose means including a timer-gated multivibrator and an OR gate;

the output of said OR gate being electrically connected to said second counter;

a battery charger;

said timer-gated multivibrator being enabled by pulses on two of its inputs;

one of said two inputs of said timer-gated multivibrator being electrically connected to another of said output terminals of said first counter and the other of said inputs to said timer-gated multivibrator being electrically connected to said battery charger, whereby said timer-gated multivibrator is energized when said battery charger is applying charge to a battery and said first counter has counted to said other of said plurality of output terminals;

said manually activatable means including a first conductor connected to one input of said OR gate and second and third inputs and a manually activatable switch means for connecting said first conductor to either of said first and second inputs, said first input being electrically connected to another of said output terminals of said first counter and said third input being connected to still another of said outputs of said first counter.

2. Apparatus according to claim 1 further comprising:
battery charger means for applying charge to said battery;
said switch means further including means for resetting said first and second counters when said rate of charging of said battery is reduced.

3. Apparatus according to claim 2 in which said measuring means further comprises:

a digital-to-analogue converter having an input electrically connected to said first counter and an output, whereby said output provides an analogue signal corresponding to the count of said first counter;

a comparator having first and second inputs and an output;

said first input being adapted to be electrically connected to said battery;

said second input being electrically connected to the output of said digital-to-analogue converter; and first counter pulse-generator means having an input and an output for applying said pulses to its output when a predetermined potential is applied to its input;

said input of said pulse-generator means being electrically connected to the output of said comparator and said output of said pulse-generator means being electrically connected to the input of said first counter.

4. Apparatus according to claim 3 in which:

said timer further includes timer pulse-generator means for generating a plurality of pulses;

said timer pulse-generator means being electrically connected to the input of said second counter, whereby a signal on the input of said second counter indicates the time from the last output signal from said comparator to said measuring means during a charging run.

5. Apparatus according to claim 4 in which said measuring means includes:

push-button means; and starting switch means for increasing the rate of charging upon either the depressing of the push-botton means switch or the reception of said second control signal.

6. Apparatus according to claim 5 further including:

means for de-energizing portions of said timer and measuring means and energizing other portions of said timer and measuring means after said rate of charging has been decreased; and energizing means for energizing said first and second counters and said first counter pulse-generator means and de-energizing said timer pulse-generator means.

7. Apparatus according to claim 6 in which said selector means further includes means connecting a certain one of said plurality of output terminals of said first counter to an input of said second counter whereby said second counter counts one pulse upon said first counter counting to a certain output.

8. Apparatus for controlling the charging of a battery, comprising: multiple-purpose means for generating a first control signal when the rate of charging of the battery falls below a predetermined rate during a charging run and generating a second control signal;

said multiple-purpose means including selector means for activating said multiple-purpose means to initiate charging runs a first predetermined time after the termination of a charging run in response to said second control signal at certain temperatures;

said selector means including manually actuatable means for including said selector means in circuit with said multiple-purpose means;

said multiple-purpose means further including measuring means for measuring the potential of a battery;

said measuring means including a first counter and means for applying pulses to said first counter;

said first counter having a plurality of output terminals;

said multiple-purpose means further including a timer;

said timer including a second counter;

said multiple-purpose means further including switch means for applying a signal to said second counter from a selected one of said plurality of output terminals of said first counter when said multiple-purpose means is measuring the time since the termination of a previous charging cycle;

said second counter including means for generating said first control signal and said second control signal;

said multiple-purpose means including means for terminating a charging run in response to said first control signal;

said selector means including a temperature-controlled switch for causing said multiple-purpose means to initiate a charging run said predetermined time after the termination of the previous charging run when the ambient temperature falls below said predetermined temperature.

9. Apparatus according to claim 8 further comprising:

battery charger means for applying charge to said battery at a predetermined rate;

said switch means further including means for resetting said first and second counters when said rate of charging is reduced.

10. Apparatus according to claim 9 in which said measuring means further comprises:

a digital-to-analogue converter having an input electrically connected to said first counter and an output, whereby said output provides an analogue signal corresponding to the count of said counter;

a comparator having first and second inputs and an output;

said first input being adapted to be electrically connected to said battery;

said second input being electrically connected to the output of said digital-to-analogue converter; and first counter pulse-generator means having an input and an output for applying said pulses to its output when a predetermined potential is applied to its input;

said input of said pulse-generator means being electrically connected to the output of said comparator and said output of said pulse-generator means being electrically connected to the input of said first counter.

11. Apparatus according to claim 10 in which:

said timer further includes timer pulse-generator means for generating a plurality of pulses;

said timer pulse-generator means being electrically connected to the input of said second counter whereby a signal on the input of said second counter indicates the time from the last output signal from said comparator to said measuring means during a charging run.

12. Apparatus according to claim 11 further including:

means for de-energizing portions of said timer and measuring means and energizing other portions of said timer and measuring means after said rate of charging has been decreased; and energizing means for energizing said first and second counters and said first counter pulse-generator means and de-energizing said timer pulse-generator means.

13. Apparatus according to claim 12 in which said selector means further includes means connecting a certain one of said plurality of output terminals of said first counter to an input of said second counter, whereby said second counter counts one pulse upon said first counter counting to said certain output.

14. Apparatus according to claim 1 in which said selector means further includes means connecting a certain one of said plurality of output terminals of said first counter to an input of said second counter, whereby said second counter counts one pulse upon said first counter counting to said certain output.

15. Apparatus according to claim 8 in which said selector means further includes means connecting a certain one of said plurality of output terminals of said first counter to an input of said second counter, whereby said second counter counts one pulse upon said first counter counting to said certain output.

* * * * *

UNITED STATES PATENT AND TRADEMARK OFFICE
CERTIFICATE OF CORRECTION

PATENT NO. : 4,097,792
DATED : June 27, 1978
INVENTOR(S) : Ward Martin Calaway

It is certified that error appears in the above-identified patent and that said Letters Patent are hereby corrected as shown below:

Column 1, line 43, the word "charger" should be inserted after the word "battery".

Column 6, line 31, the numeral "24" should be "25".

Column 10, line 9, the word "input" should be "output".

Column 12, line 65, the word "While" should be "With"

Signed and Sealed this

Fifth Day of June 1979

[SEAL]

Attest:

RUTH C. MASON
Attesting Officer

DONALD W. BANNER
Commissioner of Patents and Trademarks